United States Patent Office 3,053,738
Patented Sept. 11, 1962

3,053,738
WATER-SOLUBLE HEXACHLOROPHENE
Joel M. Goldstein, 8028 Michener St., and Alan H. Katz, 814 Upsal St., both of Philadelphia, Pa.
No Drawing. Filed July 7, 1960, Ser. No. 41,243
5 Claims. (Cl. 167—90)

This invention relates to water-soluble hexachlorophene and methods of making same.

We have found that hexachlorophene which is 2,2'-methylenebis (3,4,6-trichlorophenol) can be made water-soluble by reaction with certain organic reactants. The following examples are illustrative embodiments of our invention.

Example 1

Water-soluble hexachlorophene is formed by using low viscosity methylcellulose 15 cps. having a molecular weight from 12,000 to 38,000 (Methocel sold by Dow Chemical Company). The methylcellulose is hydrated in boiling buffer solution of pH 10. Standard USP buffer was used. (Clark-Lubs 50 ml. M/5 $H_3BO_3$, M/5 KCl and add 43.9 ml. M/5 NaOH and diluted to 200 ml.)

The mixture is then cooled to room temperature to facilitate the solution of the methylcellulose. The pure hexachlorophene is then added to the clear solution. The hexachlorophene is slow in becoming soluble and is agitated for a period of 24 hours. Low heat facilitates this solvability. For that reason the solutions were agitated in a constant temperature water bath at 30° C. The amount of hexachlorophene which became water-soluble at pH 10 is approximately 55 times that which became water-soluble at pH 7.

We may also use other types of reactive cellulose ethers, such as ethylcellulose, sodium carboxy methylcellulose and the like which react in a similar manner with hexachlorophene.

It is desirable to carry out the reaction at a pH not greater than 10 because the hexachlorophene tends to oxidize at a higher pH to form colored quinone forms.

The percentage of methylcellulose and hexachlorophene can be varied. The greater the concentration of methylcellulose the greater the amount of hexachlorophene that can become water-soluble. Methylcellulose of 15 cps. variety produces a film that is extremely flexible. We have found it advantageous to react an aqueous solution of methylcellulose in concentrations up to about 10% by weight at a pH of 10 with hexachlorophene in amounts up to about 1.80 parts by weight of the methylcellulose. We have prepared water-soluble products by following the previously described procedures by reacting methylcellulose and hexachlorophene in percentages by weight as follows:

| Percent Methylcellulose (15 cps.) | Percent Hexachlorophene |
|---|---|
| at pH 10 | |
| 0.0 | 0.059 |
| 1.0 | 0.203 |
| 1.5 | 0.236 |
| 3.0 | 0.541 |
| 10.0 | 1.80 |
| at pH 7 | |
| 0.0 | 0.0009 |
| 1.0 | 0.0024 |
| 1.5 | 0.0036 |

Example 2

Water-soluble hexachlorophene is also made by using polyvinylpyrrolidone having a molecular weight from 40,000 to 360,000 (P.V.P. sold by General Aniline and Film Company). The same procedure is used as in Example 1. The pH of the solution was kept neutral and by reacting polyvinylpyrrolidone and hexachlorophene, we obtained water-soluble products from the following components in percentages by weight:

pH 7

| Percent Polyvinylpyrrolidone | Percent Hexachlorophene |
|---|---|
| 1.0 | 0.095 |
| 3.0 | 0.114 |
| 5.0 | 0.127 |

Other suitable reactive polyamides may be used in place of the polyvinylpyrrolidone.

The aqueous solutions of hexachlorophene prepared as previously described can be used for application to the skin, or used as a bactericide, or for incorporation in soap, lotions and the like in any suitable amounts. For example, conventional toilet soap and cleansing cream can be given mild bactericidal properties by adding about 3% by weight of any one of the above aqueous solutions.

We claim:
1. The method of making hexachlorophene water-soluble with cellulose ethers which comprises the steps of hydrating the cellulose ether in a boiling aqueous buffered solution having a pH 10, cooling the mixture to room temperature, adding hexachlorophene in amounts up to 1.80 percent by weight for each 10 percent by weight of the cellulose ether, and agitating the mixture at a constant temperature of 30° C. until a clear solution is obtained.
2. The method of making hexachlorophene water-soluble with polyvinylpyrrolidone which comprises the steps of hydrating the polyvinylpyrrolidone in a boiling aqueous buffered solution having a pH 7, cooling the mixture to room temperature, adding hexachlorophene in amount up to 0.127 percent by weight for each 5 percent by weight of polyvinylpyrrolidone and agitating the mixture at a constant temperature of 30° C. until a clear solution is obtained.
3. A composition of matter comprising a water-soluble form of hexachlorophene and cellulose ether as prepared by the method of claim 1.
4. A composition of matter as defined in claim 3, wherein the cellulose ether is methyl cellulose having a molecular weight from 12,000 to 38,000.
5. A composition of matter comprising a water-soluble form of hexachlorophene and polyvinylpyrrolidone as prepared by the method of claim 2.

References Cited in the file of this patent
UNITED STATES PATENTS
2,897,120     Cronin _____ July 28, 1959

OTHER REFERENCES

Davies: Pharm. J., Jan. 31, 1948, pp. 82–83, vol. 160.
General Aniline and Film Corp., PVP, AP–81, Booklet 15M–8–57–2.5M, 1957, pp. 12, 13.
Shelanski: J. Soc. of Cosmetic Chemists, vol. 5, No. 2, June 1954, pp. 129–132.
Goldstein: JAPA Pract. Pharm. Ed., vol. 14, No. 2, February 1953, pp. 111–118.
Lesser: Drug and Cosmetic Industry, Sept. 21, 1954, 75, 1, pages 32–36.
Childs et al.: Am. Pharm. Assoc. J. Sc. Ed., vol. 45, 1956, pages 313–316.
Tillman: J. of Am. Pharm. Assoc. Sc. Ed., vol. 46, No. 4, 1957, pages 211–214.
Kennon: J. Am. Pharm. Assoc., vol. 45, No. 3, pages 157–160.
McAuliffe, JAPA Pract. Pharm. Ed., vol. 16, No. 3, pp. 157 and 177, March 1955.